US005695175A

United States Patent [19]

Hawkins

[11] Patent Number: 5,695,175

[45] Date of Patent: Dec. 9, 1997

[54] BANISTER ASSEMBLY

[75] Inventor: John Dennis Hawkins, Harrogate, United Kingdom

[73] Assignee: Ellis Hawkins Limited, Huddersfield, United Kingdom

[21] Appl. No.: 295,653

[22] PCT Filed: Feb. 26, 1993

[86] PCT No.: PCT/GB93/00400

§ 371 Date: Aug. 26, 1994

§ 102(e) Date: Aug. 26, 1994

[87] PCT Pub. No.: WO93/17201

PCT Pub. Date: Sep. 2, 1993

[30] Foreign Application Priority Data

| | | | |
|---|---|---|---|
| Feb. 27, 1992 | [GB] | United Kingdom | 9204156 |
| Jun. 12, 1992 | [GB] | United Kingdom | 9212562 |

[51] Int. Cl.$^{6}$ .......... E04H 17/14; F16C 11/06; F16B 7/00; B25G 3/28

[52] U.S. Cl. .......... 256/67; 256/59; 256/65; 256/67; 256/70; 403/56; 403/292; 403/294; 403/354

[58] Field of Search .......... 256/59, 60, 65, 256/67, 68, DIG. 2; 403/56, 76, 141, 142, 292, 294, 344, 353, 354

[56] References Cited

U.S. PATENT DOCUMENTS

| | | | |
|---|---|---|---|
| 4,013,373 | 3/1977 | Lamprecht et al. | 403/292 X |
| 4,050,211 | 9/1977 | Wahman | 52/726 |
| 4,403,767 | 9/1983 | Basey | 256/59 X |
| 4,421,302 | 12/1983 | Grimm et al. | 256/59 X |
| 4,505,456 | 3/1985 | Zieg | 256/67 |
| 4,811,508 | 3/1989 | Engelbach | 403/374 X |
| 4,898,490 | 2/1990 | Herbermann | 403/56 |

FOREIGN PATENT DOCUMENTS

| | | |
|---|---|---|
| 716696 | 12/1968 | Belgium . |
| 0085341 | 8/1983 | European Pat. Off. . |
| 1934151 | 1/1971 | Germany . |
| 3134778A1 | 3/1981 | Germany . |
| 3705809 | 9/1988 | Germany . |

*Primary Examiner*—Blair Johnson
*Assistant Examiner*—Bruce A. Lev
*Attorney, Agent, or Firm*—Richard E. Jenkins, P.A.

[57] ABSTRACT

A joint, particularly for use with banister assemblies, comprises a ball (14) fixed into position within a socket (13). The balls (14) formed at either end of a plurality of balusters (12), and sockets (13), formed in a base rail (10) and hand rail (11) are preformed at a work shop or factory and subsequently used for construction of a banister assembly. During the construction of such an assembly, the base rail (10) is fixed into position and the hand rail (11) placed in parallel, vertically spaced-apart relation to it, supported loosely by newel posts at either end. Next, balusters (12) are inserted between the base rail (10) and hand rail (11) by inserting a bottom ball of each baluster (12) into the base rail sockets (13) and adjusting the hand rail (11) to enable insertion of the upper balls into the hand rail sockets (13). Once all balusters are in position, the hand rail (11) can be firmly fixed into place. Special connectors (29,30) are used to enable adjustment and subsequent fixing into position of the hand rail (11), and a special clamp used to assist the formation of the joints where necessary. Replacement ball assemblies (52,53,54) are provided to facilitate replacement of broken balusters within existing banister assemblies. Adhesive may be used.

24 Claims, 8 Drawing Sheets

BANISTER ASSEMBLY

TECHNICAL FIELD

The invention relates to a banister assembly.

BACKGROUND ART

The traditional method of constructing banisters requires several hours work on site by a carpenter. Banisters usually comprise a base rail and a handrail, extending upwardly at an angle, interconnected by vertically arranged supporting balusters.

After the carpenter has installed the sloping bottom rail, he has to cut the lower end of each baluster to a corresponding angle, so that when the balusters are mounted on the bottom rail, they extend vertically. The upper end of the balusters also have to be cut at an angle, to receive the handrail. The carpenter also has to fit spacing blocks onto the rails, to space the balusters apart at appropriate intervals.

DISCLOSURE OF THE INVENTION

A first aspect of the invention provides a banister assembly comprising a base rail, a hand rail, and a plurality of balusters, extending between the hand rail and the base rail, the assembly being arranged to be adjustable during its construction to allow variation of angles formed between each of said balusters and said base rail and hand rail, the assembly being characterised in that end portions of each of said balusters are provided with either a ball or a socket formation and the base rail and hand rail are each provided with a plurality of complementary formations formed thereon, said complementary formations being either sockets or protrusions for cooperation with said baluster formations so as to provide variable angle joints, means being provided for rigidly securing said joints to inhibit further angular variation following attainment of a desired position.

Preferably, the end portions of each baluster are provided with a ball formation and the base rail and hand rail are each provided with sockets formed thereon.

The sockets may be formed integrally.

Said means for rigidly securing the joints may comprise adhesive.

The assembly preferably further comprises first and second newel posts located, in use, at either end of the base rail.

Preferably, the assembly is further provided with a first connector for securing at least a first end of the handrail to said first newel post.

Preferably, the first connector comprises:

a first connector member having a partially shrouded slot; and a second connector member including a link arranged to be inserted into the slot in the first connector member to join the two connector members together.

The link may be separate from the second connector member and the second connector member may also have a partially shrouded slot.

Preferably, at least one slot has an unshrouded mouth region to enable insertion of the link.

Preferably, a shrouded region of at least one slot is adapted to retain the link within the slot.

At least one, and preferably both of the connector members comprise a block of material having first and second spaced apart opposed surfaces and surrounding surface.

At least one slot may extend inwardly from the surrounding surface.

Preferably the first and second connector member are formed such that relative movement of the first and second connector members whereby the link is caused to be inserted further into at least one of the slots, is arranged to cause relative movement in a transverse direction of the first and second connectors towards each other, and preferably into abutment with each other.

Preferably, the second surface of connector member is substantially perpendicular to the surrounding surface, but is at an angle to the first surface.

Preferably, at least one slot has a base which is parallel to the first surface of the or each connector member.

The link is preferably in the form of two head to head truncated cones, such that the inner diameter of the link, where the heads meet, is less than the outer diameter.

Preferably the base of at least one slot is slightly wider than the outer diameter of the link.

Preferably the mouth of at least one slot is wider than the outer diameter of the link and the shrouded region is narrower than the outer diameter, but wider than the inner diameter of the link.

Preferably, the first and second connector members are provided with countersunk passages to enable the use of wood screws, or similar fixing means, to attach the first and second connector members to supporting surfaces.

Preferably, in use, the first connector member is recessed into an end face of a said first end of said handrail with its first surface partially protruding from the end face and the second connector member is recessed into said first newel post with its first surface partially protruding from the newel post.

Preferably, the first connector member is attachable to the end face of the handrail with its mouth region lowermost and the second connector member is attachable to the newel post with its mouth region uppermost. The link may then be inserted into the mouth region of the second connector and urged downwardly into the shrouded slot.

According to a second aspect of the present invention, a method of assembling a banister assembly is provided, the method comprising locating a base rail in position between two newel posts, locating a handrail between the newel posts and spaced from the base rail with the handrail being supported by connectors positioned on the newel posts, locating the balusters between the handrail and base rail and then urging the handrail towards the base rail to retain each of the balusters in position.

After the handrail has been urged towards the base rail, relative translational movement between the handrail and the newel posts may be prevented by the cooperation of the handrail with the newel posts.

When the handrail is urged towards the base rail the handrail and the newel posts may be urged towards each other.

According to a further aspect of the invention, there is provided a connector comprising:

a first connector member having a partially shrouded slot; and a second connector member including a link arranged to be inserted into the slot in the first connector member to join the two connector members together.

Preferably, the link is separate from the second connector member and the second connector member also has a partially shrouded slot.

Preferably, the first and second connector members are of identical construction.

Preferably, the or each slot has an unshrouded mouth region to enable insertion of the link.

Preferably, a shrouded region of the or each slot is adapted to retain the link within the slot.

Preferably, at least one of the connector members comprises a block of material having first and second spaced apart opposed surfaces and an intermediate surrounding surface.

Preferably, the or each slot extends inwardly from the surrounding surface.

The first and second connector members are preferably formed such that relative movement of the first and second connector members whereby the link is caused to be inserted further into at least one of the slots, is arranged to cause relative movement in a transverse direction of the first and second connector members towards each other.

Preferably, the relative movement of the first and second connector members causes the first and second connectors to come into abutment with each other.

Preferably, the second surface of the or each connector member is substantially perpendicular to the surrounding surface, but is at an angle to the first surface.

Preferably, the or each slot has a base which is parallel to the first surface of the or each connector member.

Preferably, the link is in the form of two head to head truncated cones, such that an inner diameter of the link, where the heads meet, is less than an outer diameter.

Preferably, the base of the or each slot is slightly wider than the outer diameter of the link.

Preferably, the mouth of the or each slot is wider than the outer diameter of the link and the shrouded region is narrower than the outer diameter, but wider than the inner diameter of the link.

Preferably, the first and second connector members are provided with countersunk passages to enable the use of wood screws, or similar fixing means, to attach the first and second connector members to supporting surfaces.

Preferably, the first connector member is recessed into an end face of a hand rail with its first surface partially protruding from the end face of a hand rail and the second connector member is embedded in a newel post with its first surface partially protruding from the newel post.

Preferably, the first connector member is attachable to the end face of the hand rail with its mouth region uppermost and a second connector member is attachable to the newel post with its mouth region lowermost.

Preferably, the first connector member is attachable to the end face of the hand rail with its mouth region lowermost and a second connector member is attachable to the newel post with its mouth region uppermost.

The present invention also includes a method of assembling a banister using the connectors as herein referred to and, the type of joints as herein referred to as well as a staircase made according to the method or incorporating connectors or joints as herein referred to.

The present invention includes any combination of the herein referred to features or limitations.

BRIEF DESCRIPTION OF DRAWINGS

By way of example, specific embodiments of the invention will now be described, with reference to the accompanying drawings, in which.

MODES FOR CARRYING OUT THE INVENTION

Figure 1:
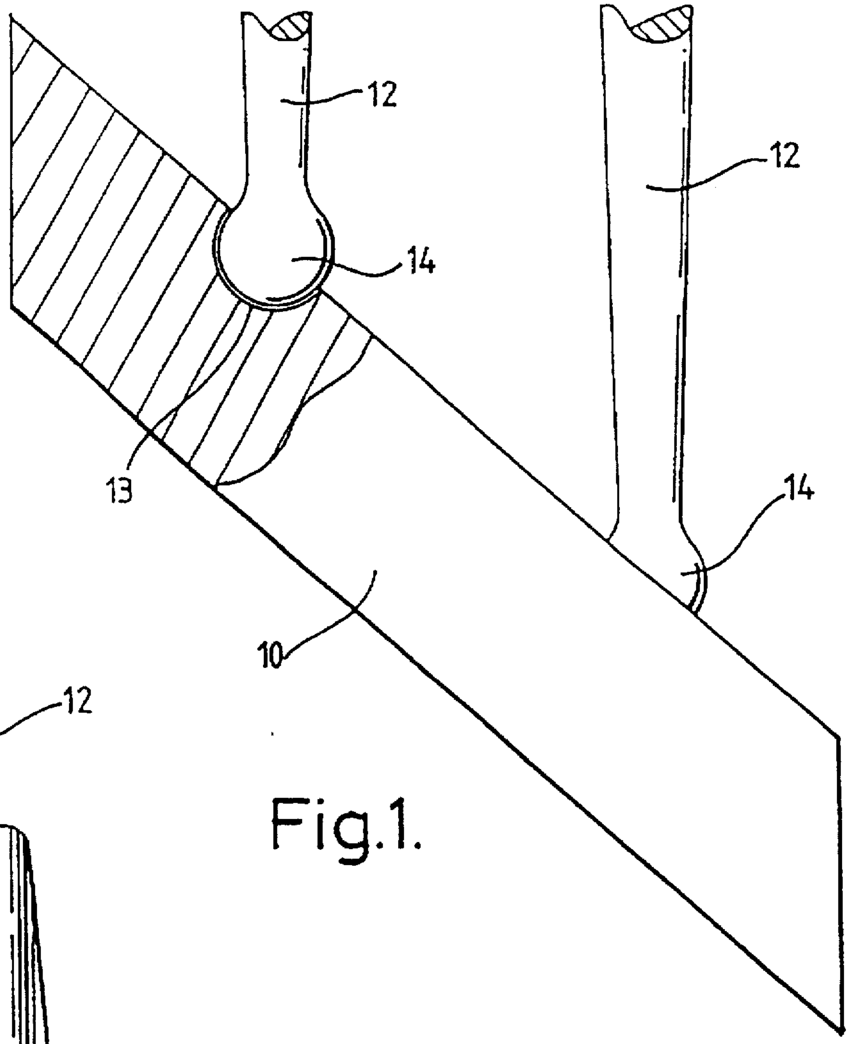
FIG. 1 is a side view, partly in cross-section, of an embodiment of a banister constructed using the method and apparatus of the invention.
Figure 2:
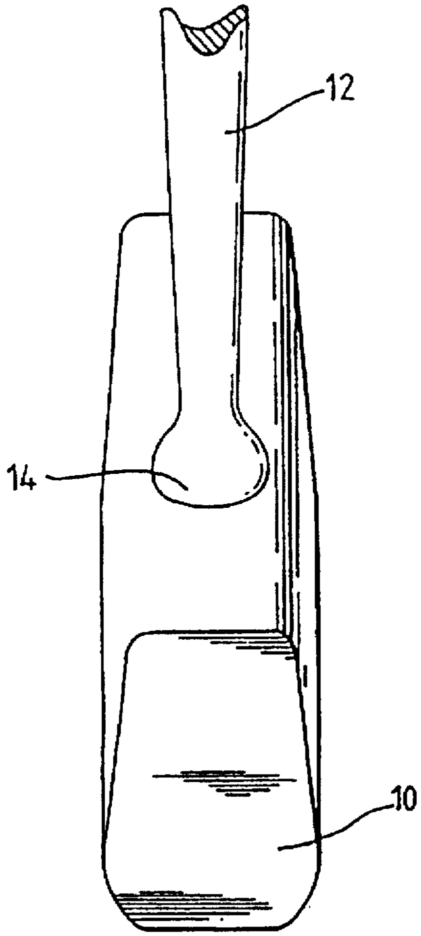
FIG. 2 is a front perspective view of the bannister shown in FIG. 1.
Figure 3:
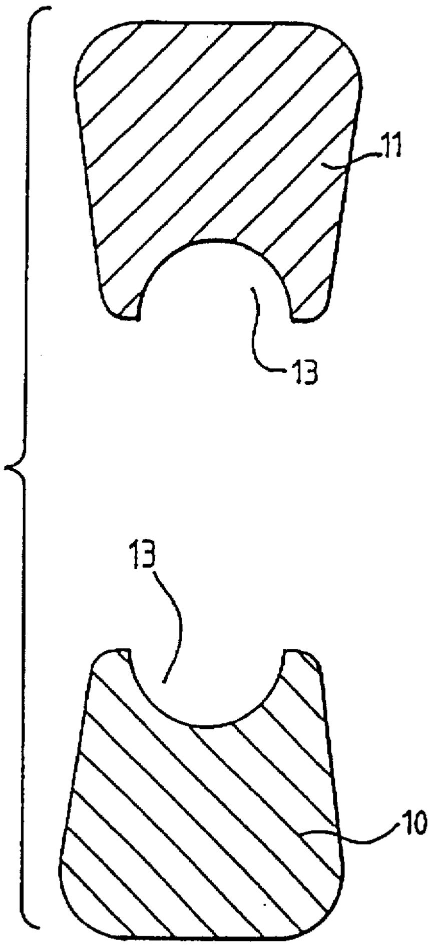
FIG. 3 shows the cross-section of a base rail and handrail of the banister.
Figure 4:
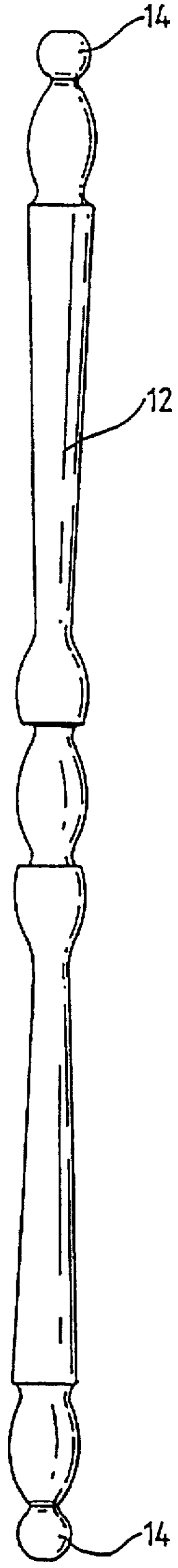
FIG. 4 is a side view of a baluster of the banister.

The banister forming a first embodiment of the invention comprises a base rail 10, a handrail 11 and a plurality of supporting balusters 12.

Preformed in a workshop or factory is a plurality of evenly spaced, part spherical sockets 13, formed in both the base rail 10 and the handrail 11. Each end of each baluster is provided with a complementary shaped ball 14. These can also be preformed in a workshop or factory.

All that needs to be done to assemble the banister on site is to fix the base rail 10 in the usual way, put a measured quantity of glue into the base rail and handrail sockets, place the balusters in position, place the handrail in position, adjust the handrail and balusters until the balusters are all vertical, the balls 14 swivelling in the sockets 13 during this process, and wait for the glue to set.

For certain applications, for example where adjustable spacing of the balusters is required on site, the sockets 13 may be preformed in blocks, which can be attached to the rails on site.

In the figures, the balls 14 are shown as being formed integrally on the balusters, for example during a turning or machining process. However, if desired, the balls may be manufactured separately and then attached to the balusters, for example using wooden pegs, screws or the like.

If desired, the balls may be formed on the top and bottom rails, the sockets being formed in the balusters.

FIGS. 5 to 8 show a handrail to newel post connector. Each connector has three parts which comprise two identical connector portions 29 and a linking member 30.

The connectors 29 are formed from cylindrical blocks of material, and have a bottom face 38 and a slotted top face 37. The slot 31 extends inwardly from the outer cylindrical wall 32 and opens onto, and is parallel with, the top surface 33.

The width of the base of the slot is arranged to be slightly greater than the outer diameter 40 of the linking member 30. The width of the slot at the top surface 37, at its region 34 adjacent to the outer cylindrical wall, is equal to that of the base of the slot. However, the innermost region 35 of the slot is partially enclosed by a shroud such that the top surface of the slot at this point is only slightly wider than the inner diameter 41 of the linking member 30.

The slot arrangement is such that the connecting link 30 may be introduced into the slot from its top surface, at region 34, and then moved inwardly to be a tight fit in the innermost end of the slot.

Figure 5:
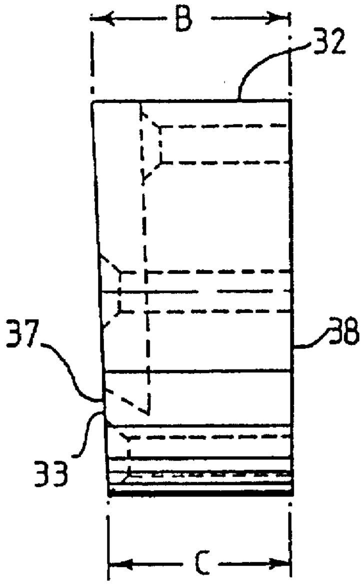
FIG. 5 is a side view of a connector member for a connector according to the second aspect of the invention.
Figure 6:
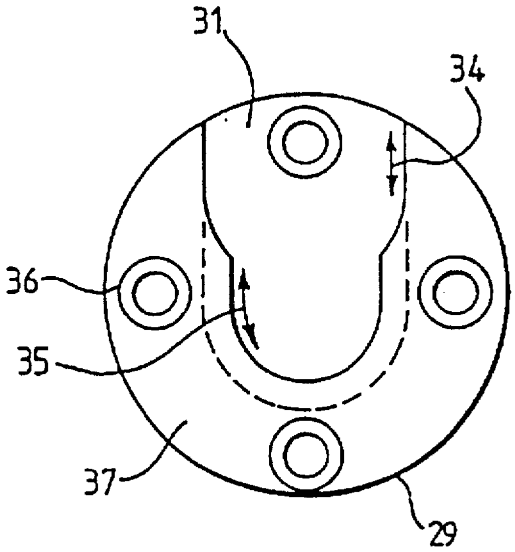
FIG. 6 is a top view of the connector member of FIG. 5.

Each connector 29 has a number of countersunk passages 36 to accept wood-screws, or similar fixing means. top surface 37 is arranged so that it is nearly, but not quite, parallel to the bottom surface 38 as shown in FIG. 5. The bottom surface 38 being at 90° to the outer cylindrical wall, but the top surface 37 being cut at an angle such that dimension "B" is greater than "C".

Figure 7:
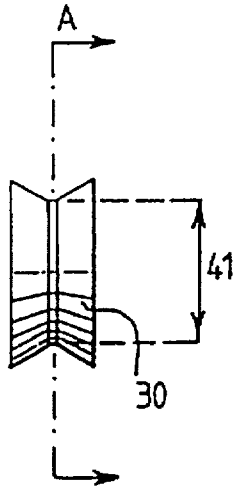
FIG. 7 is a side view of a link for use with the connector member of FIGS. 5 and 6.
Figure 8:
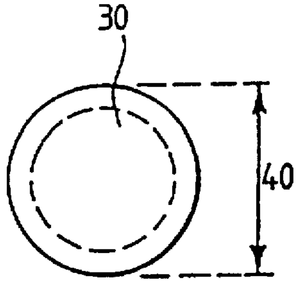
FIG. 8 is a plan view of the link of FIG. 7.
Figure 9:
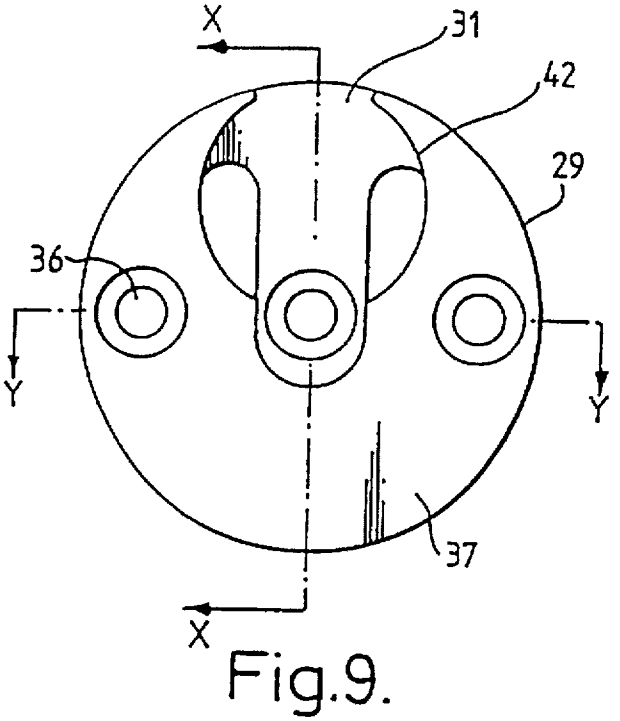
FIG. 9 is a top view of an alternative embodiment of a connector member for a connector according to the second aspect of the invention.
Figure 10:
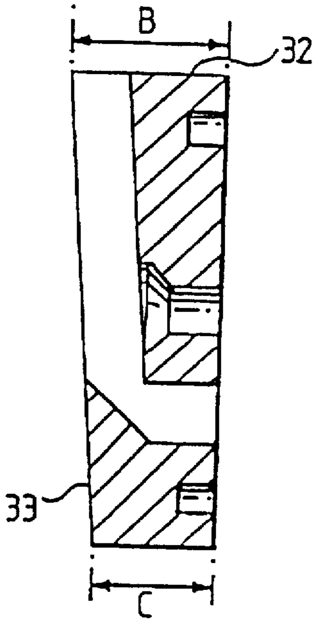
FIG. 10 is a first cross-sectional view of the connector member of FIG. 9 viewed from line X—X.
Figure 11:
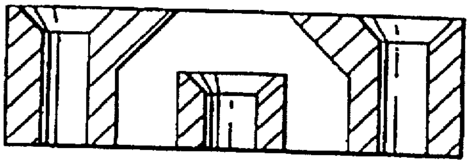
FIG. 11 is a second cross-sectional view of the connector member of FIG. 9 viewed from line Y—Y.
Figure 12:
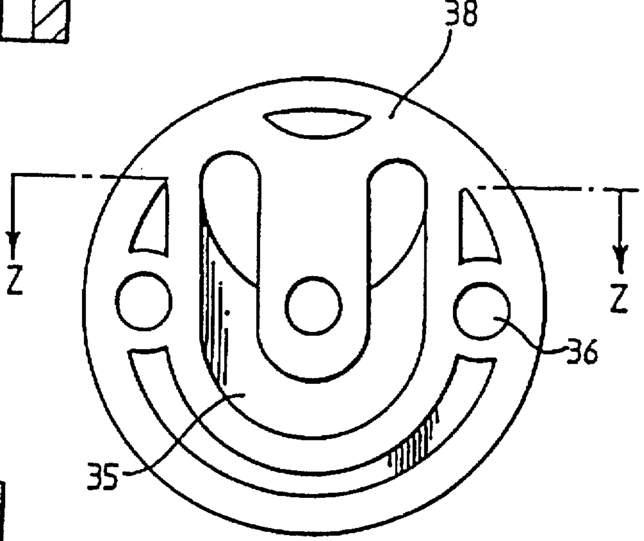
FIG. 12 is a bottom view of the connector member of FIG. 9.
Figure 13:
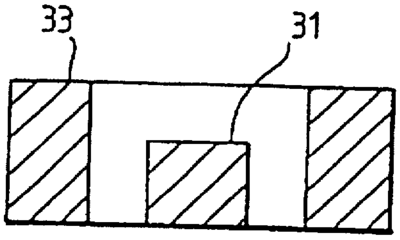
FIG. 13 is a third cross-sectional view of the connector member of FIGS. 9 and 12 viewed from line Z—Z.

The linking member 30 of FIGS. 7 and 8 is in the form of two truncated cones, head to head. The link is symmetrical about an axis "A", with each half of the member being designed to be of a complementary configuration to that of the innermost area 35 of the slot 31, so as to be able to link two connectors 29 together.

Two sets of connectors are employed:

(i) A first connector 29 being embedded into each of the newel posts (one each at the top and bottom of a stairway) so that its top face is partially protruding from that of the newel post, such that the wider, mouth, region 34 is positioned uppermost and is slightly proud of the newel post.

(ii) A link 30 is inserted into the mouth region 34 of the first connector slot and urged towards the shrouded region 35.

This operation may be performed on site, or in advance at a factory.

Alternatively for certain applications, the link 30 may be an integral part of the first connector, for instance, being formed in a single moulding.

(iii) The second connector of each pair is embedded into the end faces of the handrail with its top surface 37 partially protruding from the end of the handrail. The mouth of the slot is positioned lowermost and slightly proud of the handrail end.

In use, the procedure of banister assembly using the apparatus of FIGS. 5 to 8 is as follows.

Firstly, the base rail is positioned in the usual way, and a measured quantity of glue placed into the handrail and base rail sockets.

Next, the handrail is loosely positioned between the two newel posts, so as to provide a loose frame structure comprising base rail, newel posts and handrail. At this stage, the linking members 30 are resting lightly within the mouth region 34 of the handrail connectors.

Each baluster is then connected with its corresponding base rail socket and, one at a time, positioned lightly just within its handrail socket. It should be understood that the co-operation between the linking member 30 and the two slots 30 allows a certain amount of adjustment during banister assembly.

The initial loose fitting of the balusters within the handrail sockets is possible due to the length of the connector slots. This length is arranged such that, with the connectors in the configuration described above, the balusters may be inserted into base rail sockets and their top, ball, region positioned lightly within the handrail sockets. The handrail can be rotated around the linking member 30, to facilitate entry of the balusters, raising the lip of the socket over the top of the ball to allow the top of the ball to be pushed into the socket area.

Finally, when each baluster has been connected the handrail is driven downwards, forcing the linking members into the innermost region of the slots 31 on the handrail, and the balls of the balusters into their respective handrail sockets.

Figure 17:
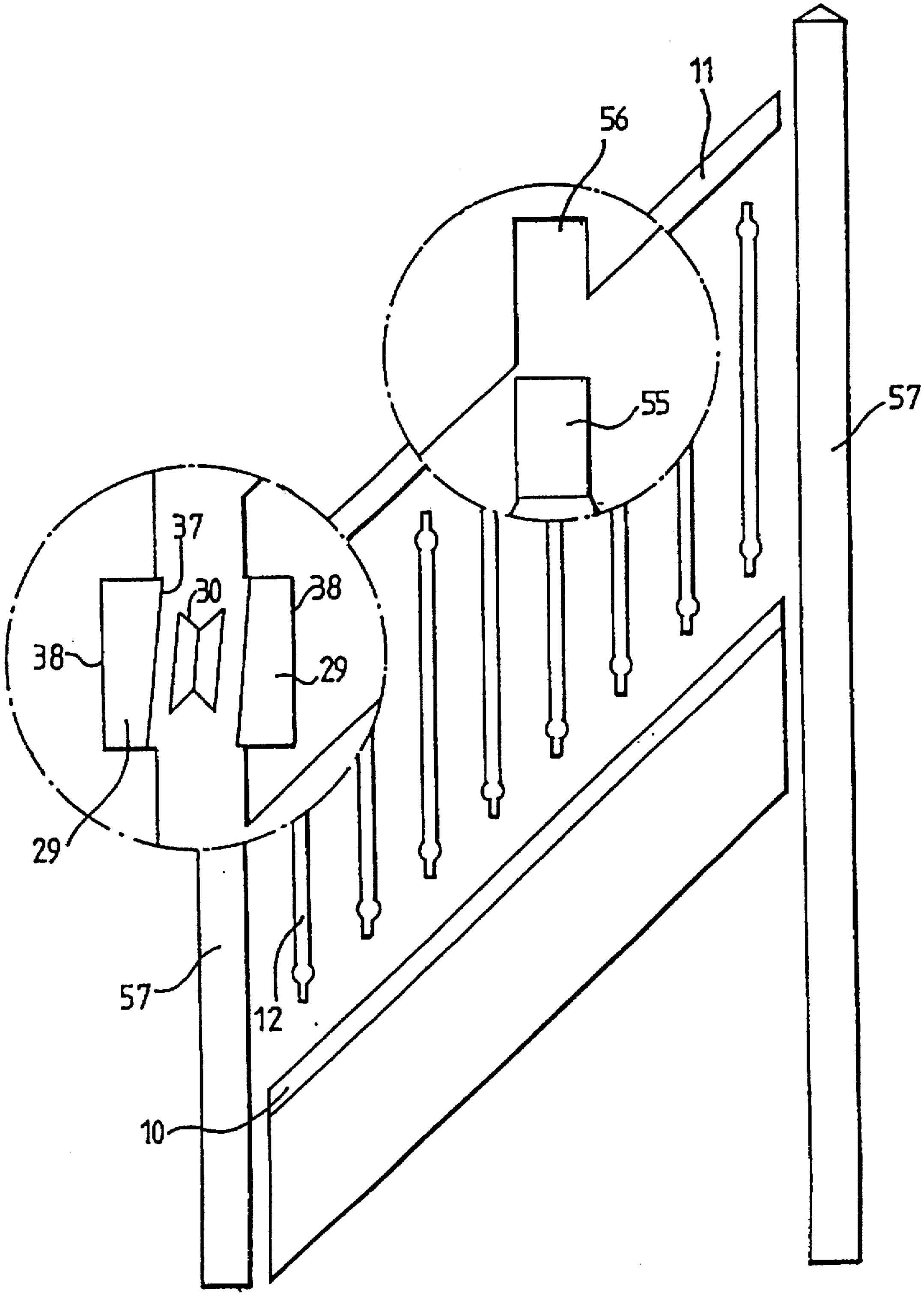
FIG 17 is an exploded view of a dowel joint type banister assembly.

Although the procedure for assembling banisters has been described with relation to ball and socket type baluster joints, the connectors of FIGS. 5 to 8 may also be used to assemble other type of banisters. FIG. 17 shows an exploded view of a banister assembly in which the balusters 12 each have a dowel 55 at their upper and lower ends which are designed to co-operate with sockets 56 in the handrail 11 and base rail 10 respectively. The Figure shows in more detail the arrangement of connectors 29 and links 30 which connect the handrail 11 to the newel posts 57. It should be noted that the bottom faces 38 of the handrail/newel post connectors are substantially parallel to the end faces of the handrail/newel posts, and are recessed in such a manner that part of the top face 37 of each connector will be slightly proud of, and the remainder will be slightly recessed into the respective end faces.

Because the top faces of the connectors are not parallel to their bottom faces, as discussed above in relation to FIG. 17 and FIG. 7, forcing the handrail connector piece and the newel post connector piece together brings the handrail and the posts together slightly, forming a good tight fit.

The connectors are equally effective when used with an embodiment in which the dowels 55 and sockets 56 are replaced by tenons and mortices.

An alternative embodiment of connector is shown in FIGS. 9 to 13, in which like parts are designated by like numerals. The connector is similar in construction to that of the connector of FIGS. 5 to 8, but uses considerably less material. The shrouded slot of this embodiment is exposed to the top surface 37 by a circular aperture 42. Operation of the connector is identical to that of the connector of FIGS. 5 to 8 and will not be discussed in further detail.

Although the connectors are described as being formed from cylindrical blocks of material they may of course be of any suitable shape such as rectangular. The connectors may be moulded or cast from any suitable material.

Although, the connectors described are for use with a banister assembly they may also find other applications, such as for use in assembling kitchen units. It is also envisaged that the link 30 and one of the connectors may be dispensed with and replaced by a screw whose head protrudes from a component surface. In this case, the dimensions of the mouth region of the remaining connector are chosen to complement the screw head such that the head effectively forms the link 30. Although this arrangement is not as versatile as the two connector and link arrangement, it does provide a simple means of securing components to one another.

During the initial fitting procedure of a banister assembly, in which the balusters are loosely positioned between base rail and hand rail, it may be found that not all of the balls will fit into their respective sockets without some degree of force. Such problems may arise, for instance, due to timber distortion occurring during storage.

A conventional G-clamp may be used to help urge the top ball joints of balusters with the hand rail but, due to the lack of all round accessibility, a G-clamp cannot be used for the base rail. For these purposes a special clamp is required.

Figure 14:
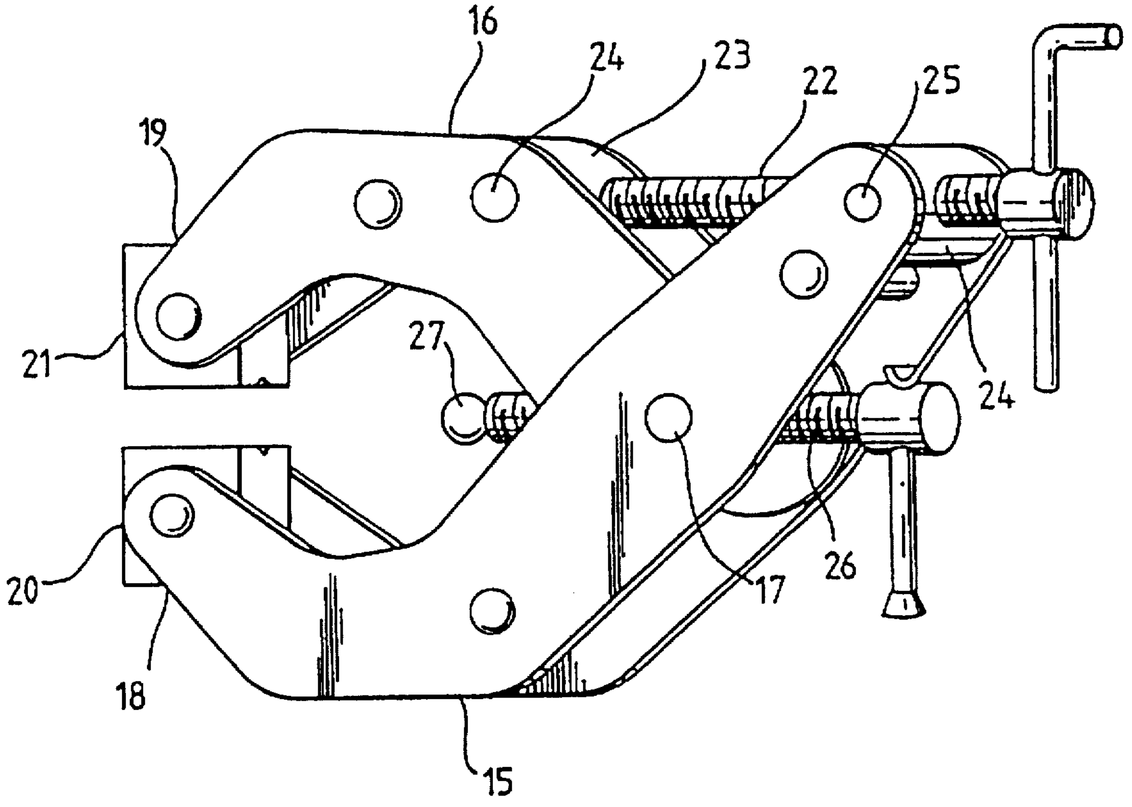
FIG. 14 is a perspective view of a clamp according to the third aspect of the invention.

The clamp, shown in FIG. 14, has two arms 15 and 16 attached to a common pivotal axis 17. The arms 15, 16 each having a clamping end 18, 19 to which clamps blocks, 20, 21 are pivotally attached. The clamp blocks 20, 21 form the jaws of the clamp and are adapted to fit the base rail 10. The jaws can be opened or closed by means of an externally threaded bolt 22. The bolt 22 is pivotally attached to the arm 16, by a first swivel joint 23, at a point 24 approximately midway between the pivotal axis 17 and the clamping end 19, and to the arm 15 by a second swivel joint 24 at a point 25, located on an extension on the opposite side of the pivotal axis 17 to the clamping end 18. The bolt 22 is attached to the joint 23 such that the bolt may be rotated freely, and passes through the joint 24 which is internally threaded, the thread of the joint 24 co-operating with the thread on the bolt to allow the clamp jaws 20, 21 to open or close upon rotation of the bolt 22.

In addition to the jaw opening/closing mechanism, a further threaded bolt 26 is provided which passes through a threaded swivel joint (not shown) forming the pivotal axis 17. Rotation of the bolt 26 within the swivel joint causing an engagement end 27 to move towards or away from the axis 17.

Figure 18:
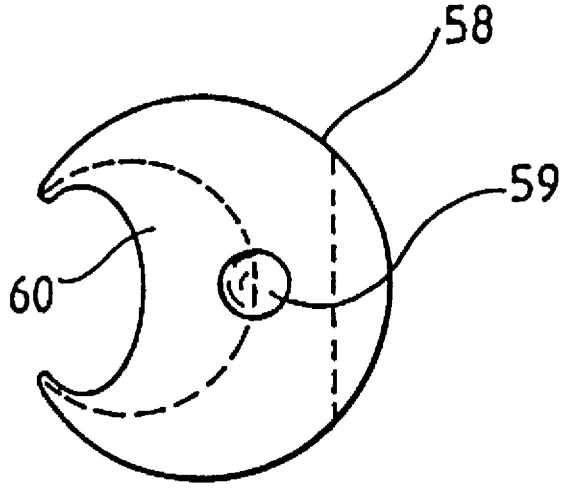
FIGS. 18 and 19 are respectively a plan view and a side cross sectional view of a clamp foot for use with the clamp of FIG. 14.
Figure 19:
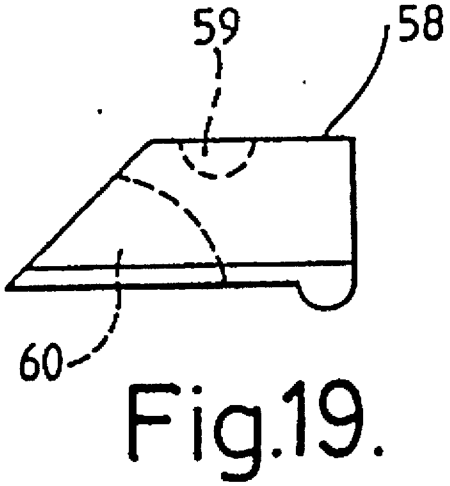

FIGS. 18 and 19 show a clamp foot 58 which is attachable via a socket region 59 to the engagement end 27 of the bolt 26. A portion 60 of the clamp foot 58 is shaped so as to conform to the shape of the balls 14.

A typical application of the clamp will now be described in relation to clamping the bottom ball of the baluster into a socket of the base rail.

Firstly, the bannister assembly is constructed up to the point where the top and base rails loosely retain the balusters by means of the connector assembly of FIGS. 5 and 8 (or 9 to 13).

If there is no timber distortion or other problems, the top rail may simply be driven downwardly, fixing the balusters into position. However, if one or more balls will not enter their sockets on the base rail, the clamp must be used.

The jaws of the clamp are first opened by means of the bolt 22 and the bolt 26 is "backed off" as much as necessary for the clamp to be passed over the base rail from above.

Next, the clamp is then moved to a desired position along the base rail such that the base rail is between the clamp blocks 20, 21 and the engagement head 27 of the bolt 26 is approximately above the baluster ball in question. The clamp blocks are profiled appropriately such that closing the jaws of the clamp around the base rail will not mark the rail 10.

Once the base rail is gripped securely by the blocks 20, 21, the portion 60 of the foot 58, which conforms to the shape of the top of the ball is placed on top of the ball 14 and the bolt 26 tightened to bring the engagement end 27 into light contact with the top of the foot 58.

Further tightening of the bolt 26 causes the foot 58 to press down onto the baluster ball and urge it into its socket.

This operation is repeated for other balusters where necessary. As well as performing the operation on base rail ball/socket joints, it can also be used for hand rail ball and sockets.

The clamp blocks 20, 21 may be given an alternative profile as necessitated by different designs of base rail and may be adapted to grip either the side walls of the base rail or a portion beneath a lip of the base rail.

Similarly, the collar may be given any shape as necessitated by different designs of balusters.

The clamp may also find application in other fields of use.

Replacement of broken balusters may be facilitated by providing special repair assemblies, which do not require removal of the handrail or base rail for fitment.

Figure 15:
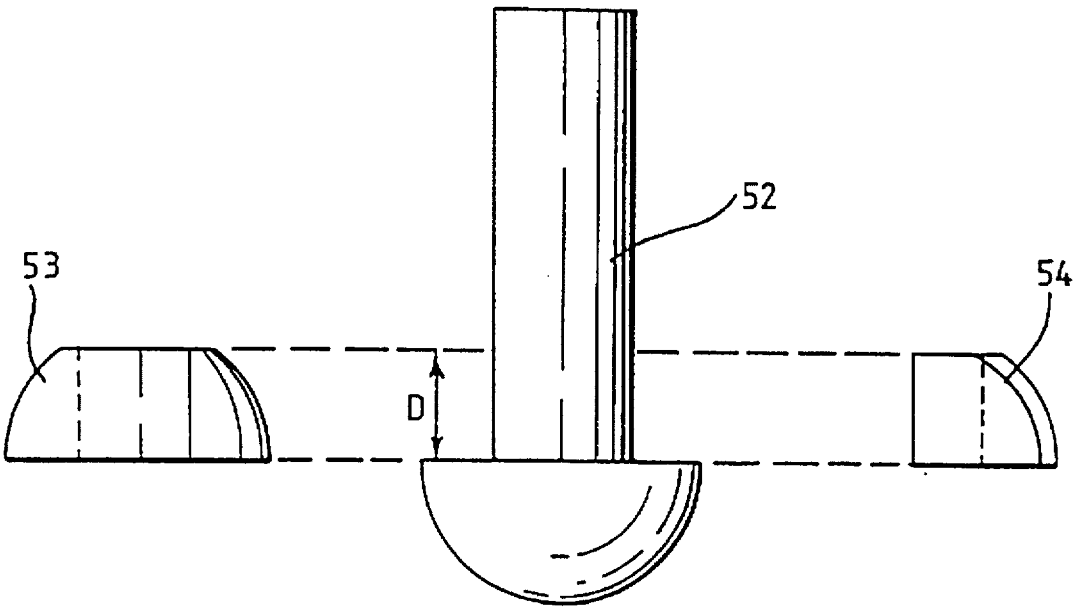
FIGS. 15 and 16 show a replacement ball and peg assembly according to the fourth aspect of the invention.
Figure 16:
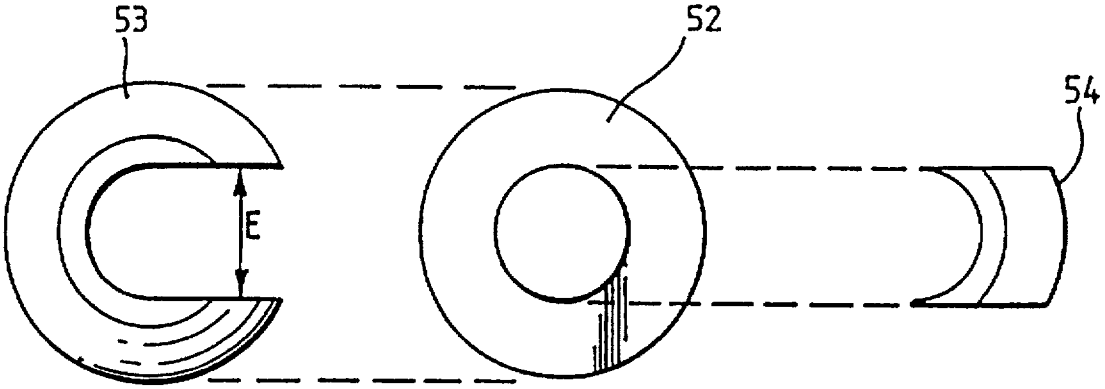

FIGS. 15 and 16 show a replacement ball and peg assembly.

The assembly comprises essentially the bottom half of a ball mounted on a peg 52 and two additional pieces 53 and 54 which, when mounted together onto the peg assembly, give the appearance of a complete, conventional ball. The assembly is designed to fit into a hollow space formed in an end region of a special replacement baluster. Replacement of a baluster is as follows:

(i) The old baluster is removed and the sockets cleaned up or replaced.

(ii) A replacement baluster is introduced with the half ball and peg pushed up such that the portion D of the peg is within the hollow end portion of the replacement baluster. Pushing the peg into the baluster in this manner enables the half ball portion to clear the lip of the base rail/handrail socket.

(iii) The base rail/handrail half ball and peg assembly is next released so as to expose portion "D", and the pieces 53 and 54 are introduced onto the peg.

If the banister assembly is for a steep stairway, the "uphill" part of the base rail socket (and the "downhill" part of the handrail socket) will be obscured and the portions 53 and 54 will need to be introduced one at a time onto the peg. This is accomplished by firstly placing portion 53 onto the peg on the "downhill" side (for the base rail) and rotating it by 90° or 180° about the axis of the peg such that the portion 54 may be introduced. The joints between portions 53 and 54 may then be hidden and the assembly locked into place by rotating portions 53 and 54 back by 90° or 180° once again, such that the portion 54 is now "uphill" and hidden by the socket shroud. The entire replacement ball assembly can be fixed into position by means of adhesive.

Either one end or both ends of the baluster may be provided with replacement ball and peg assemblies.

An alternative to the arrangement of FIGS. 15 and 16 would be to provide a spring loaded ball and peg assembly, which could be located within the hollow end portion of a replacement baluster. The ball and peg assembly is pushed into the hollow- portion, against the action of the spring, to enable insertion of the ball into the socket, and then released so that the baluster is held securely within the base rail/hand rail assemblies.

Either of the baluster replacement operations described above may be performed on conventional banister assemblies or on banister assemblies according to the present invention.

The balusters may have any desired shape.

Although the banister assembly components shown in the figures are made from wood, other materials may be used, including plastics, metal, or any combination.

The invention is not restricted to the details of the foregoing embodiment(s).

We claim:

1. A connector in combination with a ball and socket bannister assembly, (a) the banister assembly comprising:

a base rail (10), a hand rail (11), and a plurality of balusters (12) extending between the hand rail (11) and the base rail (10), the assembly being arranged to be adjustable during its construction to allow variation of angles formed between each of said balusters (12) and said base rail (10) and hand rail (11), the assembly being characterized in that end portions of each of said balusters (12) are provided with either a ball (14) or a socket (13) formation and the base rail (10) and hand rail (11) are each provided with a plurality of complementary formations (13, 14) formed thereon, said complementary formations being socket (13) formations for cooperation with said baluster ball formations (14) and being ball (14) formations for cooperation with said baluster socket (13) formations so as to provide variable angle joints, means being provided for rigidly securing said joints to inhibit further angular variation following attainment of a desired position, and (b) the connector comprising:

a first connector member (29) having a first surface (37) and a partially shrouded slot (31); and a second connector member (29) including a first surface (37) and a link (30) arranged to be inserted into the slot (31) in the first connector member (29) to join the two connector members together, and the connector being provided at an end of said hand rail (11) of said ball and socket bannister assembly, and being adapted for securing said end of said hand rail (11) to a newel post (57).

2. A connector according to claim 1, wherein the link (30) is separate from the second connector member (29) and the second connector member (29) also has a partially shrouded slot (31).

3. A connector according to claim 2, wherein a shrouded region (35) of at least one slot (31) is adapted to retain the link (30) within the slot (31).

4. A connector according to claim 1, wherein the first and second connector members (29) are of identical construction.

5. A connector according to claim 1, wherein at least one slot (31) has an unshrouded mouth region (34, 42) to enable insertion of the link (30).

6. A connector according to claim 1, wherein at least one of the connector members (29) comprises a block of material having first (37) and second (38) spaced apart opposed surfaces and an intermediate surrounding surface (32).

7. A connector according to claim 6, wherein at least one slot (31) extends inwardly from the surrounding surface (32).

8. A connector according to claim 6, wherein the second surface (38) of at least one connector member (29) is substantially perpendicular to the surrounding surface (32), but is at an angle to the first surface (37).

9. A connector according to claim 8, wherein at least one slot (31) has a base which is parallel to the first surface (37) of the or each connector member (29).

10. A connector according to claim 1, wherein the first and second connector members (29) are formed such that relative movement of the first and second connector members (29), whereby the link (30) is caused to be inserted further into at least one of the slots (31), is arranged to cause relative movement in a transverse direction of the first and second connector members (29) towards each other.

11. A connector according to claim 10, wherein the relative movement of the first and second connector members (29) causes the first and second connectors (29) to come into abutment with each other.

12. A connector according to claim 1, wherein the link (30) is in the form of two head to head truncated cones, such that an inner diameter of the link, where the heads meet, is less than an outer diameter.

13. A connect according to claim 12, wherein the base of at least one slot (31) is slightly wider than the outer diameter of the link (30).

14. A connector according to claim 13, wherein the mouth of at least one slot (31) is wider than the outer diameter of the link (30) and the shrouded region is narrower than the outer diameter, but wider than the inner diameter of the link.

15. A connector according to claim 1, wherein the first and second connector members (29) are provided with countersunk passages to enable the use of wood screws, or similar fixing means, to attach the first and second connector members to supporting surfaces.

16. A connector according to claim 15, wherein in use, the first connector member (29) is attachable into an end face of a hand rail (11) with its first surface (37) partially protruding from the end face of a hand rail (11) and the second connector member (29) is embedded in a newel post with its first surface (37) partially protruding from the newel post.

17. A connector according to claim 16, wherein the first connector member (29) is attachable to the end face of the hand rail (11) with its mouth region uppermost and a second connector member (29) is attachable to the newel post with its mouth region lowermost.

18. A connector according to claim 17, wherein the first connector member (29) is attachable to the end face of the hand rail (11) with its mouth region lowermost and a second connector member (29) is attachable to the newel post with its mouth region uppermost.

19. A banister assembly comprising a base rail (10), a hand rail (11), and a plurality of balusters (12) extending between the hand rail (11) and the base rail (10), the assembly being arranged to be adjustable during its construction to allow variation of angles formed between each of said balusters (12) and said base rail (10) and hand rail (11), the assembly being characterized in that end portions of each of said balusters (12) are provided with either a ball (14) or a socket (13) formation and the base rail (10) and hand rail (11) are each provided with a plurality of complementary formations (13,14) formed thereon, said complementary formations being socket (13) formations for cooperation with said baluster ball formations (14) and being ball (14) formations for cooperation with said baluster socket (13) formations, so as to provide variable angle joints, means being provided for rigidly securing said joints to inhibit further angular variation following attainment of a desired position, and first and second newel posts (57) are located at each end of base rail (10), and a first connector is provided for securing at least a first end of said hand rail to said first newel post and wherein said first connector comprises a first connector member (29) having a partially shrouded slot (31); and a second connector member (29) including a link (30) arranged to be inserted into the slot (31) in the first member (29) to join the two connector members together:

wherein the link (30) is separate from the second connector member (29) and the second connector member (29) also has a partially shrouded slot (31) and each slot (31) has an unshrouded mouth region (34,42) to enable insertion of the link (30), and a shrouded region (35) of each slot (31) is adapted to retain the link (30) within the slot (31).

20. An assembly according to claim 19, wherein at least one of the connector members (29) comprises a block of material having first (37) and second (38) spaced apart opposed surfaces and a surrounding surface (32) of the or each slot (31) extends inwardly from the surrounding surface (32).

21. An assembly according to claim 20, wherein the first and second connector members (29) are formed such that relative movement of the first and second connector members (29) whereby the link (30) is caused to be inserted further into at least one of the slots (31), is arranged to cause relative movement in a transverse direction of the first and second connector members (29) towards each other and such relative movement causes the first and second connector members (29) to come into abutment with each other.

22. An assembly according to claim 21, wherein the second surface (38) of at least one connector member (29) is substantially perpendicular to the surrounding surface (32), but is at an angle to the first surface (37), and at lease one slot (31) having a base which is parallel to the first surface (37) of at least one connector member (29).

23. An assembly according to claim 20, wherein in use, the first connector member (29) is recessed into an end face of said first end of said hand rail (11) with its first surface (37) partially protruding from the end face and the second connector member (29) is recessed into said first newel post (57) with its first surface (37) partially protruding from the newel post (57) and wherein the first connector is attachable to the end face of the hand rail (11) with its mouth region lowermost and the second connector member (29) is attachable to the newel post with its mouth region uppermost.

24. An assembly according to claim 19, wherein the link (30) is in the form of two head to head truncated cones, such that an inner diameter of the link, where the heads meet, is less than an outer diameter and at least one connector member (29) is formed such that the base of its respective slot (31) is slightly wider than the outer diameter of the link (30), and the mouth of at least one slot (31) is wider than the outer diameter of the link (30) and the shrouded region is narrower than the outer diameter, but wider than the inner diameter of the link.

* * * * *